J. N. FARRAR.
RAILWAY CAR WHEELS.
No. 109,310.             Patented Nov. 15, 1870.
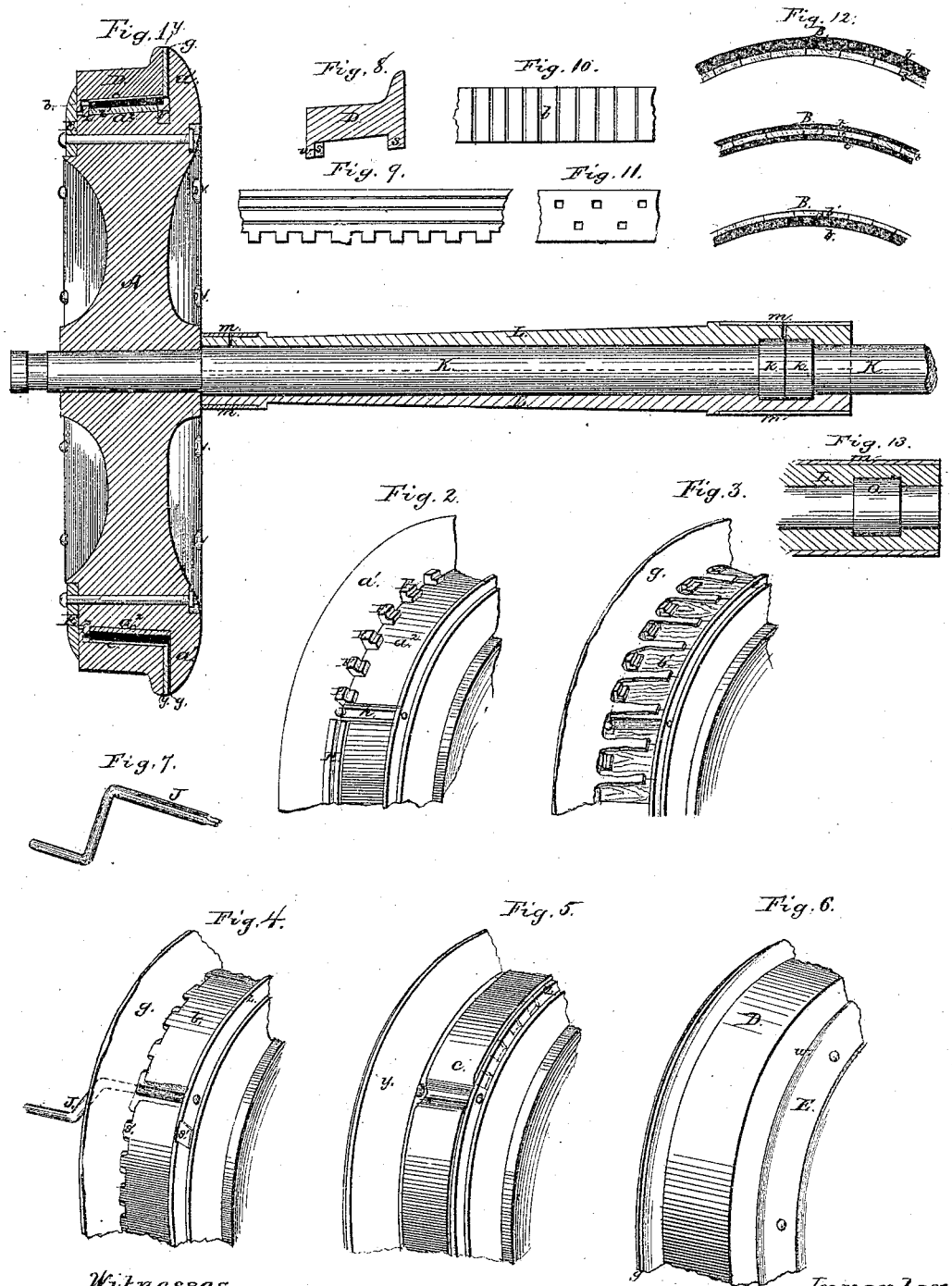

United States Patent Office.

JOHN N. FARRAR, OF PEPPERELL, MASSACHUSETTS.

Letters Patent No. 109,310, dated November 15, 1870.

IMPROVEMENT IN RAILWAY-CAR WHEELS.

The Schedule referred to in these Letters Patent and making part of the same.

I, JOHN N. FARRAR, of Pepperell, in the county of Middlesex and State of Massachusetts, have invented certain Improvements in Car-Wheels and Axles, of which the following is a specification.

Figure 1 represents a longitudinal central section of my improved wheel and axle; and Figures 2, 3, 4, 5, 6, 7, 8, 9, 10, 11, 12, and 13, detailed views of the same.

This invention has for its object to furnish an improved car-wheel and axle for railroads, which shall be strong and durable, which will reduce the expenses of maintaining in order the rails, wheels, and machinery, and at the same time increase the comfort and safety of travelers, by constructing the wheels and axles in a manner which shall materially reduce the noise and jarring, rasping, and liability of breaking the rails, axles, and wheels.

My invention consists in a wheel constructed so as to secure elasticity of tread, by means of rubber, or rubber and wood-packing under the tire, in such manner as to secure strength under concussion, and to avoid any displacement of parts.

In the drawing—

A represents the body of the wheel, cast with a flange $a^1$ upon the inner side of its tread $a^2$; also, a row of cogs, F, cast in the right angle between the tread $a^2$ and flange $a^1$, also, raised from the tread $a^2$ is a thin rim or ring, $z$, and on the inside of the wheel, around the bolt-holes, are depressions, $v$, for bolt-nuts. The tread $a^2$ is slightly beveled.

The cogs F may be made of wood, set in a mortise, as shown in fig. 1; or the metallic cogs may be united all the way around the tread, forming a shoulder, H, as shown in fig. 2. The rim $z$ may be made separately from the body of the wheel A, or be cast in cogs, as shown in dotted lines in fig. 5.

Upon the tread or face $a^2$ is placed a packing, B, formed by a combination of rubber $b$ and wood, $b'$, which packing is fitted closely between the cogs F and rim or ring $z$, and is sufficiently thick to project above the cogs F and rim $z$; the rubber $b$ may be solid or of skeleton form, by holes, grooves, or their equivalent, as shown in figs. 9, 10, and 11.

On the cog side of the flange $a'$ rests a rim of rubber or other soft and flexible material, $g$, which extends down between the cogs F and under or united with the rubber-packing B.

Outside of the rim of elastic substance $g$ is a metallic washer, $y$, which is fitted closely to the cogs F.

Upon the elastic packing B is a closed thin tire or band, $c$, which can be made to tighten upon the packing B by means of a key, J, placed in a hole through the flange $a^1$, which, when turned, twists the band upon itself in a small rectangular recess, $h$, made in and on the tread $a^2$ of the wheel A.

D is a metallic tire, with an outwardly-projecting flange $u$ extending upward along the inside of the flange $a^1$, but allowing room between for the rubber-rim $g$ and metallic washer $y$.

It also has an inwardly-projecting flange, $w$, which extends downward to the tread $a^2$, leaving sufficient room for proper elastic radial motion to the tire D.

This tire D is made slightly flaring on the inside, the greater diameter being under the flange $w$.

The tire D is held in place and prevented from slipping on the elastic packing B by a cog, $s$, made on the inside of the tire, as shown in fig. 8, which fits into a corresponding niche, $s'$, in the body of the wheel or rim $z$, or fitted between the cogs F, as shown in fig. 4.

The tire D is kept in place by a ring collar-plate, E, which fits into a recess formed for its reception on the side of the body A, to which it is securely bolted.

K is a shaft, upon which is secured the wheel.

$k$ represents a head or shoulder, turned upon the end of each wheel-shaft or central axle.

L is a long round box, made in two pieces, made stronger midway, with a recess, $o$, formed in the bore, at the center, of proper size and shape to fit the heads $k\ k$ of the shafts K K, and allow a free rotation of the same therein.

The box L is formed so as to extend the whole length, or nearly so, of the shafts K, from wheel to wheel.

The pieces of which the box L is composed are firmly bound together, over the central shafts, by strong metallic bands $m\ m$ shrunk or bolted around the same, the whole forming an axle which will revolve as one piece, or allow each wheel to act independently, as circumstances require.

By this construction the axle will allow each wheel to roll independently around curves without injury to themselves or the rails over which they run, as is frequently the case when the wheels and axle are rigidly connected, and consequently, always hold the same relative potition to each other, and in passing curves will rasp and injure both wheels and rails by draging the outer wheel on the rail, and materially increasing the liability to accident by breaking the wheel or flange and breaking or forcing apart the rails.

As all the parts of the axle combined will revolve whenever the wheels are in motion, it resembles a solid axle; the construction thereof is neat, simple, and strong.

The tire D will yield when the wheel strikes an obstruction, thus softening the concussion, reducing the wear and battering of the wheels and rails, and rendering them more durable.

The packing B, being somewhat elastic, prevents much of the constant jar and noise and harsh sensations attending the passage of the car, which is unavoidable in the old manner.

The elastic band $g$, between the flange $a^1$ and washer $y$, relieves the dead concussion from the side blows of the flange against the rails, and tends to reduce the liability of breaking the flange. The washer $y$ prevents the tire-flanges from wearing the elastic rim $g$.

The cogs F or shoulders H serve both to strengthen the flange $a^1$ of the wheel A, and as a safety-rest for the tire D in case it should receive a blow sufficient to injure the packing B.

The inwardly-projecting flange is at the same distance from the tread $a^2$ that the cogs F are from the tire over them, and therefore will both strike together. These cogs may be of wood if desired, as before mentioned.

In all ordinary usage, and under all circumstances proper to the practical method of railroading, the tire D is not intended ever to compress the packing sufficiently to reach or come in contact with the cogs F or body of the wheel; but, if in an accident the wheels should come in contact with any formidable obstacle on the track, the packing B will be protected thereby.

The packing B may be of skeleton form or solid, as before mentioned, to suit light or heavy cars. The wood $b'$ may be under or above the rubber, or between two layers of the same, as shown in fig. 12.

The rim $z$ prevents the packing B from coming in contact with the inwardly-projecting flange of the tire D; it may be cast with the body A of the wheel, or separately, in a ring form, as before mentioned.

The closed band $c$ is tightened upon the packing B by the key J, so as to allow the flaring inside of the tire D to be firmly and easily secured to the wheel. When the key is removed, the band $c$ is allowed to relax against the tire D, thus forming a strong and compact wheel.

Having thus fully described my invention,

What I claim as new, and desire to secure by Letters Patent, is—

1. The wheel A, provided with cogs F and flange 2, in combination with the tire D provided with the flange $w$, and with the interposed packing B, substantially as described.

2. The combination of elastic rim $g$, packing B, washer $y$, and flange $a$, substantially as set forth.

3. The packing B, in combination with the ring $z$, arranged within the flange $w$ of the tire D, all as set forth.

4. The packing B, composed of rubber $b$ and wood $b'$ combined, the rubber being solid, or skeleton-formed by means of any shaped holes or grooves, all substantially as shown.

5. The combination of closed band $c$, key J, and rectangular recess $h$ on tread $a^2$, substantially as set forth.

6. The combination and arrangement of the inwardly-projecting flange $w$ with relation to the tread $a^2$, the flange $z$, and the rim E, substantially as set forth.

7. The combination of body of wheel A cast with flange $a^1$ packing B, constructed and arranged as described and modifications shown, elastic rim $g$, cogged or plain rim or ring $z$, band $c$, ring collar-plate E, and tire D, all arranged substantially as described.

In testimony whereof, I have signed my name to this specification in the presence of two subscribing witnesses.

JOHN N. FARRAR.

Witnesses:
  CARROLL D. WRIGHT,
  CHARLES F. BROWN.